(12) United States Patent
Walker et al.

(10) Patent No.: US 11,294,810 B2
(45) Date of Patent: Apr. 5, 2022

(54) MEMORY REQUEST THROTTLING TO CONSTRAIN MEMORY BANDWIDTH UTILIZATION

(71) Applicant: ADVANCED MICRO DEVICES, INC., Santa Clara, CA (US)

(72) Inventors: William L. Walker, Fort Collins, CO (US); William E. Jones, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 321 days.

(21) Appl. No.: 15/838,809

(22) Filed: Dec. 12, 2017

(65) Prior Publication Data

US 2019/0179757 A1    Jun. 13, 2019

(51) Int. Cl.
*G06F 12/08*       (2016.01)
*G06F 12/0862*   (2016.01)
*G06F 11/30*       (2006.01)
*G06F 13/16*       (2006.01)
*G06F 12/0811*   (2016.01)

(52) U.S. Cl.
CPC ...... *G06F 12/0862* (2013.01); *G06F 11/3037* (2013.01); *G06F 12/0811* (2013.01); *G06F 13/161* (2013.01)

(58) Field of Classification Search
CPC ............. G06F 12/0862; G06F 11/3037; G06F 12/0811; G06F 13/161; G06F 8/4442; G06F 9/3802; G06F 9/3814; G06F 9/383; G06F 2212/602
USPC ......................................................... 711/137
See application file for complete search history.

(56) References Cited

U.S. PATENT DOCUMENTS

| | | | | |
|---|---|---|---|---|
| 6,775,749 | B1 * | 8/2004 | Mudgett | G06F 12/0831 711/119 |
| 6,895,584 | B1 * | 5/2005 | Belkin | G06F 9/5027 718/100 |
| 8,516,121 | B1 * | 8/2013 | Telang | H04L 47/25 709/226 |
| 9,606,800 | B1 * | 3/2017 | Hameenanttila | G06F 9/3836 |
| 2006/0161762 | A1 * | 7/2006 | Eisen | G06F 9/3844 712/233 |

(Continued)

FOREIGN PATENT DOCUMENTS

EP        1783603  A2      5/2007

OTHER PUBLICATIONS

Stack Overflow Prefetch distance and degree of prefetch (Year: 2011).*

(Continued)

*Primary Examiner* — Paul M Knight (57) ABSTRACT

A processing system includes an interconnect fabric coupleable to a local memory and at least one compute cluster coupled to the interconnect fabric. The compute cluster includes a processor core and a cache hierarchy. The cache hierarchy has a plurality of caches and a throttle controller configured to throttle a rate of memory requests issuable by the processor core based on at least one of an access latency metric and a prefetch accuracy metric. The access latency metric represents an average access latency for memory requests for the processor core and the prefetch accuracy metric represents an accuracy of a prefetcher of a cache of the cache hierarchy.

22 Claims, 4 Drawing Sheets

(56) References Cited

U.S. PATENT DOCUMENTS

| | | | |
|---|---|---|---|
| 2007/0094453 A1* | 4/2007 | Santhanakrishnan | ........................ G06F 12/0862 711/137 |
| 2008/0155196 A1 | 6/2008 | Black et al. | |
| 2010/0191876 A1* | 7/2010 | Muppirala | ............ G06F 3/0613 710/39 |
| 2011/0113199 A1* | 5/2011 | Tang | ................... G06F 15/8069 711/130 |
| 2013/0138887 A1 | 5/2013 | Chou | |
| 2013/0297910 A1* | 11/2013 | Smolens | ............... G06F 9/3851 712/205 |
| 2014/0108740 A1* | 4/2014 | Rafacz | ............... G06F 12/0862 711/137 |
| 2016/0034400 A1 | 2/2016 | Dale et al. | |
| 2016/0062768 A1* | 3/2016 | Jagannathan | ....... G06F 9/30047 711/137 |
| 2016/0342365 A1* | 11/2016 | Nosaka | ................. G06F 3/0625 |
| 2018/0004670 A1* | 1/2018 | Sudhir | ................ G06F 12/0862 |
| 2018/0157602 A1* | 6/2018 | Frey | .................... G06F 12/0862 |

OTHER PUBLICATIONS

International Search Report and Written Opinion dated Dec. 11, 2018 for corresponding International Application No. PCT/US2018/048350, 15 pages.

Nguyen, Khang T., "Introduction to Memory Bandwidth Monitoring in the Intel Xeon Processor E5 v4 Family". Intel Software Developer Zone, Feb. 11, 2016, 7 pages.

International Preliminary Report on Patentability dated Jun. 25, 2020 for International Application No. PCT/US2018/048350, 12 pages.

Sparsh Mittal, "A Survey of Recent Prefetching Techniques for Processor Caches", ACM Computing Surveys, ACM, vol. 49. No. 2, New York, NY, U.S.A., Aug. 2, 2016, pp. 1-35.

Hidetsugu Irie et al., "CCCPO Robust Prefetcher Optimization Technique Based on Cache Convection", Second International Conference on Networking and Computing, Dec. 2011, pp. 1-7.

Vincent Selfa et al., "A Simple Activation/Deactivation Prefetching Scheme for Chip Multiprocessors", 2016 24th Euromicro International Conference on Parallel, Distributed, and Network-Based Processing (PDP), Feb. 17, 2016, pp. 143-150.

Biswabandan Panda, "SPAC: A Synergistic Prefetcher Aggressiveness Controller for Multi-core Systems", IEEE Transactions on Computers, IEEE, USA, vol. 65. No. 12, Dec. 1, 2016, pp. 3740-3753.

Extended European Search Report dated Aug. 13, 2021 for Application No. 18888488.6, 16 pages.

* cited by examiner

MEMORY REQUEST THROTTLING TO CONSTRAIN MEMORY BANDWIDTH UTILIZATION

BACKGROUND

Many processing systems pool memory resources such that the same memory is shared by multiple processor cores. This often leads to instances whereby the link between a set of processor cores and the corresponding memory becomes saturated with memory requests, which results in increased overall memory access latencies. Moreover, an oversubscribed memory link can result in lower overall system performance compared to a link that is not fully saturated.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Oversubscription or saturation of the link between a compute cluster and local memory negatively impacts overall system performance. Techniques described herein provide for improved memory link efficiency in a processing system by constraining the memory bandwidth used by a memory resource consumer of a compute complex through throttling of the rate at which memory requests to a memory accessed via the memory link are issuable by the memory resource consumer. The memory resource consumer so constrained can include an individual processor core of the compute complex, or a particular thread being executed by a processor core of the compute complex. In some embodiments, an access latency metric and a prefetch accuracy metric for the memory resource consumer is monitored, and the particular memory request throttling implemented for the memory resource consumer is based on one or both of these metrics. The memory request throttling is achieved, for example, by modifying prefetcher aggressiveness on behalf of the memory resource consumer, by modifying the maximum number of pending memory transactions available to the memory resource consumer, or a combination of modifying the prefetcher aggressiveness and maximum number of pending memory transactions available. Thus, this approach seeks to reduce inaccurate prefetch speculation and cap the number of memory requests the memory resource consumer may issue at any given time, and thus limit the memory link bandwidth that can be consumed by the memory resource consumer while also attempting to improve the efficacy of those memory requests that are issued by the memory resource consumer.

Figure 1:
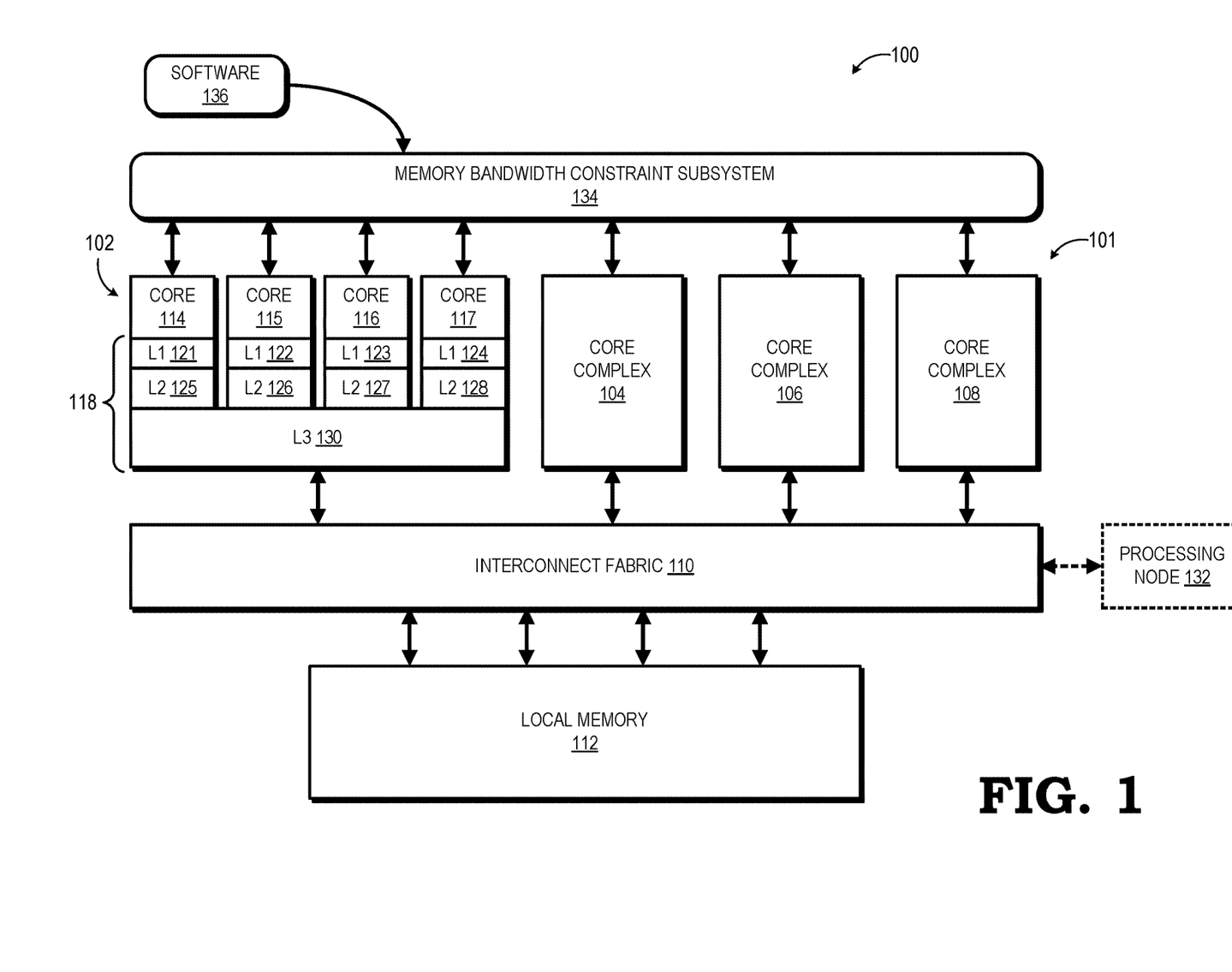
FIG. 1 is a block diagram illustrating a processing system employing memory request throttling in accordance with some embodiments.

FIG. 1 illustrates a processing system 100 utilizing memory request throttling for improved memory utilization efficiency in accordance with some embodiments. The processing system 100 includes one or more processing nodes, such as processing node 101. The processing node 101 includes one or more compute complexes, such as compute complexes 102, 104, 106, 108, an interconnect fabric 110, and a local memory 112. Each compute complex includes one or more processor cores, such as four processor cores 114, 115, 116, 117. The processor cores include, for example, central processing unit (CPU) cores, graphics processing unit (GPU) cores, digital signal processor (DSP) cores, or a combination thereof. It will be appreciated that the number of processor cores of a compute complex may be fewer or more than four.

Each compute complex further includes a cache hierarchy 118 having one or more levels of caches, such as a first level (L1), a second level (L2), and a third level (L3) of caches. Although the illustrated example includes three levels, in other embodiments the cache hierarchy 118 includes fewer than three levels or more than three levels. Each caching level includes one or more caches at that level. To illustrate, the compute complex 102 implements small private caches for each processor core at L1, which are depicted as L1 caches 121, 122, 123, 124, each associated with a corresponding one of processor cores 114-117. Further, in some embodiments, the compute complex also implements larger private caches for each processor core at L2, which are depicted as L2 caches 125, 126, 127, 128 corresponding to processor cores 114-117, respectively. Each of the L2 caches 125-128 is private to its corresponding processor core, but the cache hierarchy 118 operates to maintain coherency between the L2 caches 125-128. In other embodiments, two or more L1 caches may share a single L2 cache. For the L3 caching level, the cache hierarchy 118 implements an L3 cache 130 that is shared by the processor cores of the compute complex 102, and thus shared by at least the L2 caches 125-128. In other embodiments, the L3 caching level may include more than one L3 cache shared by the L2 caches 125-128 in various combinations.

The interconnect fabric 110 operates as the interface between the cache hierarchy 118 of each compute complex and the local memory 112, as well as the interface between the compute complexes 102, 104, 106, 108, and the interface between the processing node 101 and any other processing nodes 132 of the processing system 100. The interconnect fabric 110 may be implemented as, for example, a HyperTransport fabric, an Infinity fabric, and the like. The local memory 112 includes one or more separate random access memory (RAM) components and, in some embodiments, includes multiple links between the RAM component and the interconnect fabric 110, and each link may be allocated to a separate compute complex (or subsets of the compute complexes may share a given link between the interconnect fabric 110 and the local memory 112).

In operation, an operating system (OS), hypervisor, or software application assigns sets of instructions representing certain processes to the processor cores of the compute complexes 102-108 for execution, whereby the execution of a set of instructions by a particular processor core is referred to as a "thread." In the course of execution, these threads manipulate the processor cores to issue memory requests that serve to load data from the local memory 112 (or the local memory of another processing node). Such data can include instructions for execution or operand data to be manipulated during execution of instructions. As is well known in the art, this data typically is temporarily cached at one or more levels of the cache hierarchy 118 to facilitate data access efficiency, and thus when the cache hierarchy 118 issues a memory request on behalf of a thread for data that is stored in the cache hierarchy 118 in a valid state, that memory request can be efficiently serviced by the cache hierarchy 118. However, when a memory request cannot be fulfilled by the cache hierarchy 118 (that is, there is a "cache miss" for the entire cache hierarchy 118), the L3 cache 130 of the compute complex executing the thread must then forward the memory request on to the local memory 112 via the interconnect fabric 110 for fulfillment. In view of the caching ability provided by the cache hierarchy 118, a memory request typically takes one of two forms: demand-type memory requests in which a processor core has executed an instruction which requires a particular data block that is not currently present in a register of the processor core, and prefetch-type memory requests in which a prefetcher of a cache is predicting what data will be needed by the processor core in the near future and thus issuing a speculative memory request to obtain this predicted data so that it is cached when the processor core issues a demand-type memory request for the data.

With each processor core of a compute complex typically executing multiple threads concurrently, and with each of these threads frequently issuing both demand-type memory requests and prefetch-type memory requests that cannot be fulfilled by the cache hierarchy 118 and thus requiring fulfillment by the local memory 112, the link between the compute complex and the local memory 112 can become congested or oversubscribed, and this oversubscription of the compute complex-memory link typically impacts overall performance of the processing system 100. Accordingly, in at least one embodiment, the processing node 101 further includes a memory bandwidth constraint subsystem 134 configured to selectively throttle the rate at which memory requests are issuable by a memory resource consumer in the processing node 101 so as to reduce the risk of memory link oversubscription. In some embodiments, the memory resource consumers throttled in this way are individual threads at each processor core, whereas in other embodiment the memory resource consumers are the individual processor cores as a whole. In yet other embodiments, the memory resource consumers throttled by the memory bandwidth constraint subsystem 134 include a combination of individual threads and processor cores as a whole.

As described in greater detail below, in some embodiments the memory bandwidth constraint subsystem 134 is implemented as separate components within the caches of the cache hierarchy 118 of each compute complex 102-108, with some components configured to monitor memory requests issued to the local memory 112 so as to ascertain latency metrics representative of the average access latencies for memory requests issued to the local memory 112, and other components configured to monitor the prefetchers of one or more cache levels to ascertain prefetch accuracy metrics representative of the accuracy of the prefetchers of the caches for each memory resource consumer. Other components of the memory bandwidth constraint subsystem 134 then use one or both of the access latency metric and the prefetch accuracy metric for a memory resource consumer to determine a throttle level to apply to that memory resource consumer. This throttle level operates to set one or both of: a prefetcher aggressiveness for one or more prefetchers issuing prefetch-type memory requests on behalf of the memory resource consumer; and a maximum number of pending memory requests available for, or otherwise issuable by, the resource consumer at any given time. In doing so, the memory bandwidth constraint subsystem 134 operates to constrain the memory bandwidth consumed by any given memory resource consumer as appropriate, and thus facilitate more efficient utilization of the link between the compute complex and the local memory 112.

In some embodiments, the memory bandwidth constraint subsystem 134 operates to dynamically set throttle limits to improve overall system performance, whereas in other embodiments, the memory bandwidth constraint subsystem 134 operates to set throttle limits in accordance with a fixed target bandwidth constraint imposed by a software application 136 for purposes of, for example, isolation or differentiation. In still other embodiments, the memory bandwidth constraint subsystem 134 operates to both attempt to ensure that a software-imposed target bandwidth constraint is met, while also operating to dynamically adjust throttling levels in addition to the software-imposed bandwidth constraint. These approaches are described in greater detail herein with reference to FIGS. 3 and 4.

Figure 2:
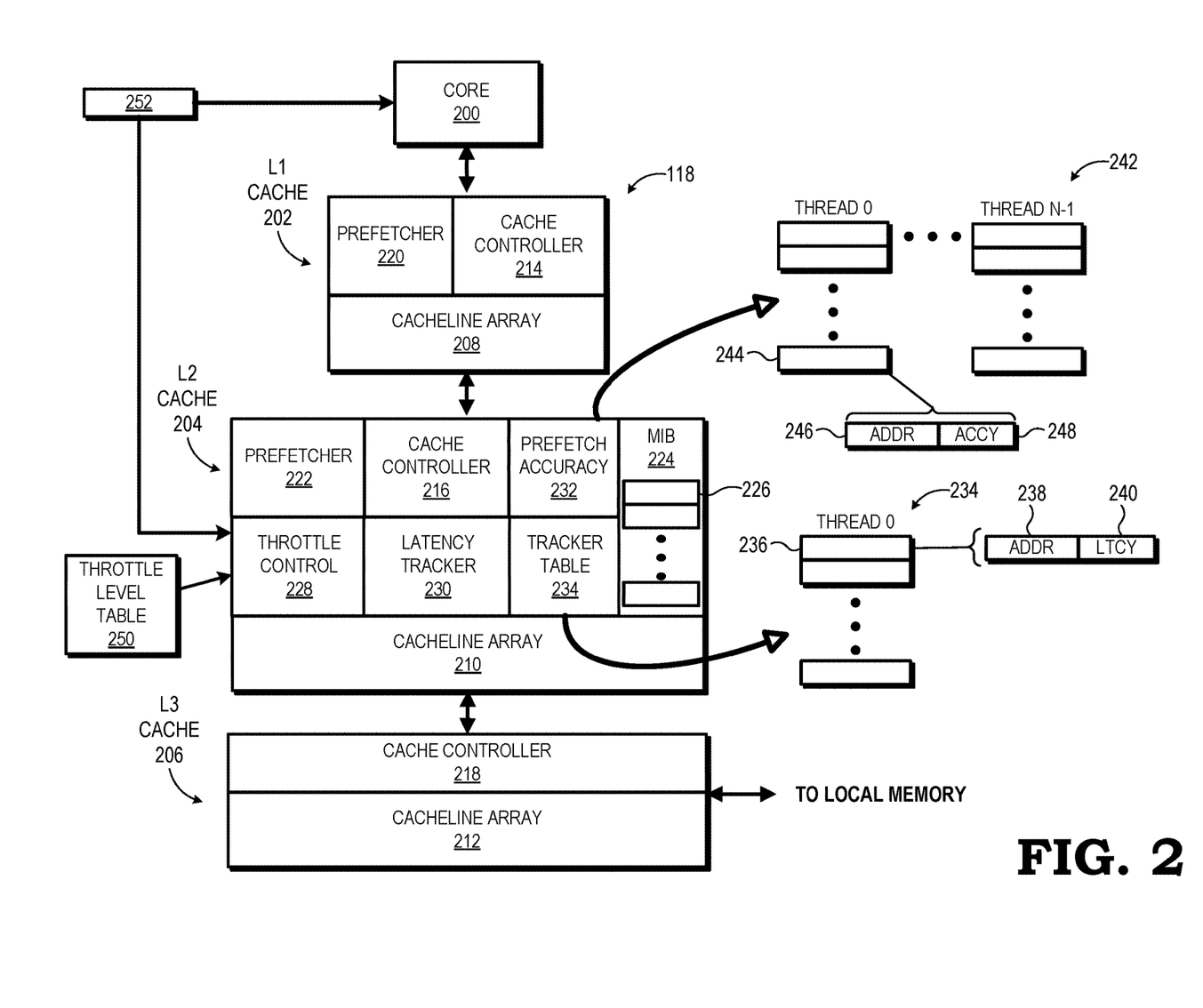
FIG. 2 is a block diagram illustrating a processor core and a corresponding cache hierarchy of the processing system of FIG. 1 in greater detail in accordance with some embodiments.

FIG. 2 illustrates a portion of the cache hierarchy 118 for a corresponding processor core 200 of a compute complex in accordance with some embodiments. The processor core 200 represents one of the processor cores of a compute complex of the processing system 100, such as one of processor cores 114-117 of the compute complex 102. The illustrated portion of the cache hierarchy 118 supporting the processor core 200 includes an L1 cache 202 (representing, for example, one of the L1 caches 121-124), an L2 cache 204 (representing, for example, one of the L2 caches 125-128), and an L3 cache 206 (representing, for example, the L3 cache 130). The L1 cache 202, the L2 cache 204, and the L3 cache 206 each includes a cacheline array (cacheline arrays 208, 210, 212, respectively) and a cache controller (cache controllers 214, 216, 218, respectively) to control access to the cacheline array. The cacheline arrays 208, 210, 212 each includes a plurality of entries to store a corresponding cacheline of data, along with tag information for the cacheline, including a corresponding address, status bits, and the like. Further, in this example the L1 cache 202 includes a prefetcher 220 and the L2 cache 204 has a prefetcher 222, wherein the prefetchers 220, 222 are configured to speculatively prefetch cachelines for their respective caches. The L2 cache 204 further includes a miss information buffer (MIB) 224 that acts as the buffer for L2 read misses that are thus bound for the L3 cache 206 or local memory 112. The MIB 224 thus has a plurality of MIB entries 226, with each MIB entry 226 configured to store information for a corresponding memory request that was an L2 read miss before the cache controller 216 processes the memory request for issuance to the L3 cache 206 or direct to the local memory 112.

With respect to the processor core 200 and the illustrated portion of the cache hierarchy 118 associated therewith, the memory bandwidth constraint subsystem 134 includes a throttle controller 228, a latency tracker 230, and a prefetch accuracy tracker 232. In one embodiment, these components are implemented at the L2 cache 204 as shown by FIG. 2, whereas in other embodiments some or all of these components may be implemented at other cache levels. The latency tracker 230 is configured to monitor the access latencies of memory requests issued by memory resource consumers associated with the processor core 200 and which are fulfilled by the local memory 112, and from these latencies provide an access latency metric representative of the current latency in fulfilling memory requests to the local memory 112. To illustrate, in some embodiments the latency tracker 230 maintains a tracker table 234 to track the times required to fulfill a memory request issued to the local memory 112 for each of a sampled subset of memory requests. Thus, the table 234 includes a plurality of entries 236, with each entry 236 having an address (ADDR) field 238 to store an address or address portion associated with a sampled memory request and a latency (LTCY) field 240 to store a value representing the time duration or latency required to fulfill the corresponding sampled memory request. From the latencies represented by the values of the latency fields 240 of the entries 236, the latency tracker 230 determines an average, or nominal, access latency, and provides this average access latency, or another value determined from this average access latency, to the throttle controller 228 as an access latency metric to be used by the throttle controller 228 in memory request throttling. An average access latency may be determined separately for each memory resource consumer associated with the processor core 200. Because these memory resource consumers share the same link to memory, the average access latency determined for memory requests for the processor core 200 (regardless of which memory resource consumer issued the memory requests) is sufficiently representative of the average access latency for any given memory resource consumer of the processor core 200.

The prefetch accuracy tracker 232 is configured to monitor the prefetch accuracies of the prefetchers operating on behalf of the processor core 200, including the prefetcher 220 of the L1 cache 202 and the prefetcher 222 of the L2 cache 204. To this end, the prefetch accuracy tracker 232 maintains an accuracy table 242 for each prefetcher operating on behalf of the processor core 200. In one embodiment, each accuracy table 242 is used to track recent prefetch-type memory requests issued by the corresponding prefetcher on a per-thread basis and further track whether each tracked prefetch-type memory request was an "accurate" prefetch; that is, whether the prefetched cacheline associated with the tracked prefetch-type memory request ultimately was the target of a demand-type memory request for the thread. Accordingly, in some embodiments, the accuracy table 242 is implemented as a data structure having a matrix of entries 244, with each column of entries 244 associated with a corresponding thread of N threads currently executing at the processor core 200, and each entry 244 within that column having an address (ADDR) field 246 to store an address or other identifier of a corresponding prefetch-type memory request and an accuracy (ACCY) field 248 to store a value indicating whether the corresponding cacheline was ultimately the target of a demand-type memory request for the thread (e.g., a single bit value whereby "0" indicates the prefetched cacheline was not an accurate speculative prefetch and "1" indicates the prefetched cacheline was an accurate speculative prefetch). As such, the prefetch accuracy tracker 232 monitors the prefetches issued by the prefetchers 220, 222 and populates their corresponding accuracy tables 242 accordingly. The prefetch accuracy tracker 232 then periodically or continuously evaluates the prefetch accuracies represented in the fields 248 of the entries 244 of the accuracy tables 242, and from this information determines and updates a prefetch accuracy metric representative of the prefetch accuracy of the corresponding prefetcher. As different threads are more susceptible to accurate prefetch speculation than others, the prefetch accuracy tracker 232, in one embodiment, determines and maintains a separate prefetch accuracy metric for each thread. In other embodiments, a single prefetch accuracy metric is determined for all threads (or subsets of two or more threads) for the corresponding prefetcher.

The throttle controller 228 is configured to use one or both of the current access latency metric from the latency tracker 230 and the current prefetch accuracy metric(s) from the prefetch accuracy tracker 232 to set or throttle a rate at which a corresponding memory resource consumer associated with the processor core 200 is permitted to issue memory requests that are fulfilled by the local memory 112, and thus modify the current memory bandwidth utilization attributed to the memory resource consumer. As described in greater detail below, in at least one embodiment, the latency tracker 230 throttles a memory resource consumer by selecting a particular throttle level for the memory resource consumer from a predefined set of throttle levels based on one or both of the latency metric and the corresponding prefetch accuracy metric. Each throttle level of this set configures different parameters that influence the number of memory requests that are issuable by the memory resource consumer, including setting parameters for prefetcher aggressiveness, which in turn controls the rate at which a given prefetcher issues prefetch-type memory requests on behalf of the memory resource consumer, setting a parameter for the maximum number of pending memory requests available to the memory resource consumer (which controls the total number of direct-to-memory memory requests the memory resource consumer may have issued on its behalf), or a combination thereof. In at least one embodiment, this set of throttle levels is implemented as a throttle level table 250, which includes a data structure that is hardcoded, programmed at implementation time via fuses or other one-time programmable elements, programmed by an integrator or user via software-visible registers, or the like. This throttle-setting process is described in greater detail below with reference to FIG. 3.

In addition to, or instead of, dynamically adjusting memory request throttle levels based on monitoring of prefetch accuracy and memory request latency, in some embodiments a software application (e.g., software application 136, FIG. 1) specifies a maximum memory bandwidth utilization metric for one or more threads of the software application, and the throttle controller 228 is configured to toggle through throttle levels to find a throttle level for the one or more threads that satisfies the specified maximum bandwidth utilization metric. Accordingly, in at least one embodiment, the processor core 200 includes or has access to a storage element 252 (e.g., a register) for which the software application executes at least one instruction that causes a value representative of a software-specified constraint on the maximum memory bandwidth utilization for a corresponding thread to be stored to the storage element 252, and this value is communicated to the throttle controller 228 for implementation for that thread. This software-defined throttling process is described in greater detail below with reference to FIG. 4.

Figure 3:
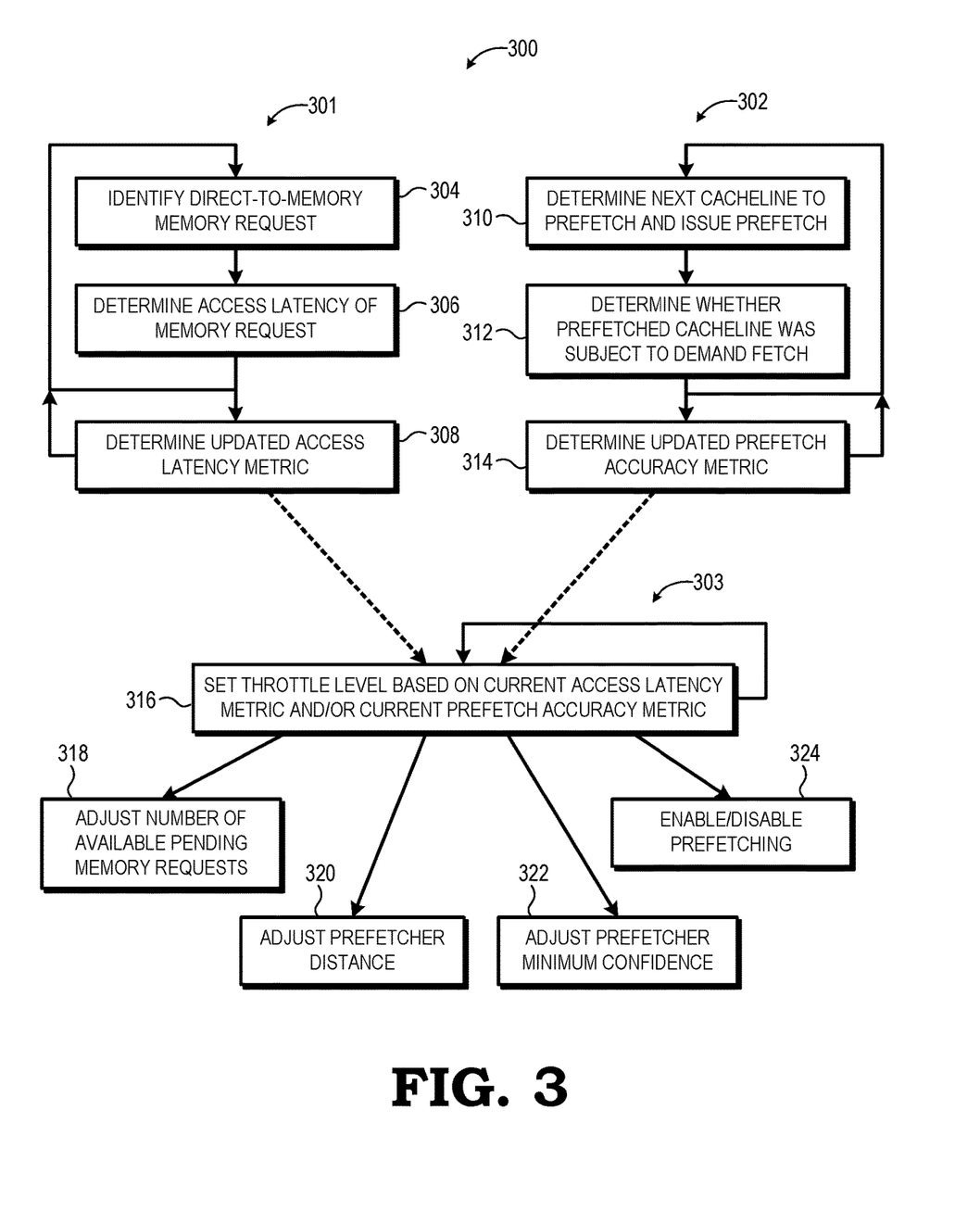
FIG. 3 is a flow diagram illustrating a method for dynamic memory request throttling in accordance with some embodiments.

FIG. 3 illustrates an example method 300 for dynamically adjusting a memory request throttle level for a particular thread, a particular processor core, or other particular memory resource consumer of a compute complex of the processing system 100 in accordance with some embodiments. For ease of illustration, the method 300 is described in the context of the example implementation of the processing system 100 of FIG. 1 and the example implementations of the cache hierarchy 118 and the memory bandwidth constraint subsystem 134 of FIG. 2.

The method 300 includes three processes that operate in parallel: an access latency monitoring process 301; a prefetch accuracy monitoring process 302; and a throttle level setting process 303. The latency monitoring process 301 initiates at block 304 with the L2 cache 204 filtering memory requests from the processor core 200 to identify a direct-to-memory memory request that is being issued to the local memory 112; that is, a memory request that cannot be fulfilled by a cache of the cache hierarchy 118 of the compute complex implementing the processor core 200 and thus is sent to the local memory 112 for fulfillment. To illustrate, when a memory request is issued from the processor core 200 to the cache hierarchy 118, one or more probes may be sent to each cache in the cache hierarchy 118 to determine whether a cacheline with the requested data is present and valid in at least one cache. In the event that the probes reveal that no such valid cacheline is cached at the cache hierarchy 118, the L3 cache 206 forwards the memory request to the interconnect fabric 110 for fulfillment by the local memory 112. Concurrently, the latency tracker 230 allocates an entry 236 in the tracker table 234 for the direct-to-memory request.

At block 306, the latency tracker 230 tracks how long it takes for the memory request to be fulfilled and stores a value representative of this latency in the allocated entry 236 for the memory request. To illustrate, in one embodiment the latency tracker 230 stores a start time stamp derived from a local clock source to the latency field 240 when the memory request is issued from the compute complex and then stores a stop time stamp derived from the local clock source (e.g., a system time clock) when the data from the memory request is received from the local memory 112 at the compute complex, and then calculates the latency as the difference of these two time stamps, and stores a value representing this different to the latency field 240.

The process of blocks 304 and 306 is repeated for some or all direct-to-memory memory requests issued for the processor core 200 so as to populate multiple entries 236 with latency values for direct-to-memory memory requests. In some embodiments, each direct-to-memory memory request is monitored and recorded in the tracker table 234, whereas in other embodiments the direct-to-memory requests are sampled at some fixed or dynamically adjustable rate (e.g., one out of every 5 direct-to-memory access requests are monitored, or only direct-to-memory memory requests to a specific address range or monitored, and the like) to determine a sample set of direct-to-memory memory requests to track, and this sample set is maintained and updated in the tracker table 234. The tracker table 234 has a limited number of entries 236, and thus to implement a sliding-window analysis, the latency tracker 230 implements a least-recently-used (LRU) process to overwrite older entries 236 with newly-identified direct-to-memory memory requests when the tracker table 234 is full.

Periodically or in response to some trigger, at block 308 the latency tracker 230 evaluates the latency values in the latency fields 240 of the occupied entries 236 (or a subset thereof) of the tracker table 234 to determine an updated access latency metric representative of the latencies of recent memory requests issued to the local memory 112 by the processor core 200. In some embodiments, the latency tracker 230 determines a current average, or nominal, latency value from the considered access latency values and provides a representation of this current average latency as the updated access latency metric. In other embodiments, the latency tracker 230 determines the updated access latency metric based on a median access latency, based on a maximum access latency, based on a minimum access latency, based on a trimmed mean access latency, or the like. The updated access latency metric is then made available to the throttle controller 228, and block 308 is repeated for a next iteration of updates.

Turning to the prefetch accuracy monitoring process 302, this process is performed in parallel for each prefetcher monitored by the prefetch accuracy tracker 232 (e.g., prefetcher 220 of the L1 cache 202 and prefetcher 222 of the L2 cache 204). Further, as noted above, the prefetch accuracy may be monitored on a per-thread basis or a per-core basis, depending on configuration. For purposes of illustration, the process 302 is described on a per-thread basis, but this same approach is readily adapted for a per-core approach using the guidelines provided herein. The process 302 initiates at block 310 with the subject prefetcher implementing a prefetching algorithm to identify the next cacheline to speculatively prefetch in the expectation that the data of the cacheline is eventually to be requested by the corresponding thread and issuing a prefetch-type memory request to access that cacheline from the local memory 112. In response to issuing this prefetch-type memory request, the prefetch accuracy tracker 232 allocates an entry 244 in the accuracy table 242 for the prefetch-type memory request in association with the corresponding thread.

At block 312, the prefetch accuracy tracker 232 determines the prefetch accuracy of prefetch-type memory requests represented in the accuracy table 242. To this end, the prefetch accuracy tracker 232 monitors the demand-type memory requests issued on behalf of the thread and in the event that a demand-type memory request is issued for the cacheline that was the subject of a prefetch-type memory request represented in the accuracy table 242, the prefetch accuracy tracker 232 updates the accuracy field 248 of the entry 244 allocated to that prefetch-type memory request to reflect that the prefetch of that cacheline was an accurate prefetch (e.g., writes a "1" to the field 248). Otherwise, if a prefetched cacheline is not subject to a subsequent demand-type memory request (that is, the thread does not "use" the prefetched data) within a certain time period, then the prefetch accuracy tracker 232 updates the accuracy field 248 to reflect that the prefetch of that cacheline was an inaccurate, or erroneous, prefetch (e.g., by writing or maintaining a "0" at the field 248).

Periodically or in response to a trigger, at block 314 the prefetch accuracy tracker 232 updates a prefetch accuracy metric for the thread based on the accuracy table 242, whereby the prefetch accuracy metric represents the accuracy of the prefetcher in prefetching cachelines of the thread. As prefetch accuracy can be represented as the ratio of the total number of accurate prefetches for the thread to the total number of prefetches for the thread, in some embodiments the prefetch accuracy tracker 232 determines the total number of entries 244 for the thread in the accuracy table 242 that indicate an accurate prefetch (e.g., have a "1" in the accuracy field 248 of the corresponding entry 244) and also determines the total number of entries 244 for the thread in the accuracy table 242, and determines the current value of the prefetch accuracy metric based on a ratio of these two numbers. The process of block 314 is repeated for some or all of the threads being monitored by the prefetch accuracy tracker 232.

Concurrent with the processes 301 and 302, iterations of the throttle level setting process 303 are performed by the throttle controller 228 on a periodic basis or in response to another trigger event. An iteration of the process 303 is represented by block 316, at which the throttle controller 228 sets a throttle level for a thread, processor core, or other memory resource consumer based on one or both of the current access latency metric and the prefetch accuracy metric for the memory resource consumer at the most recent iterations of process 301 and process 302, respectively. For ease of illustration, it is assumed for the following that the memory resource consumer is a thread of the processor core 200, but the described technique is readily adapted for use in implementations whereby the memory resource consumer is a processor core or other memory resource consumer using the guidelines provided herein.

A given throttle level set for a thread operates to restrict the rate at which memory requests are issued to the local memory 112 on behalf of the thread, and thus constrains the thread's usage of the bandwidth between the compute complex employing the processor core and the local memory 112. This restriction may be accomplished in any of a variety of ways, or combinations thereof. As represented by block 318, a throttle level may set or modify the number of pending memory requests available to the thread at any given time, which thus limits the rate at which memory requests are issuable on behalf of the thread. As described above, the MIB 224 (FIG. 2) serves as the buffer at the L2 cache 204 that stores memory requests that have missed in the cache hierarchy 118 and thus are waiting for issuance to the local memory 112 for fulfillment. Accordingly, in one embodiment the cache controller 216 of the L2 cache 204 may modify the number of MIB entries 226 available for use by a thread based on the throttle level set for that thread. When the thread has used all MIB entries 226 available to it, the thread is unable to issue any further memory requests to the local memory 112, and thus controlling the number of MIB entries 226 available to the thread acts to control the maximum number of memory requests that may be issued to the local memory 112 by the thread.

As represented by blocks 320, 322, and 324, the throttle level set for a given thread also may modify the aggressiveness of a prefetcher in issuing prefetches for the thread. The prefetch algorithm implemented by the prefetcher is controlled by a number of factors, including prefetch confidence and prefetch distance. Prefetch confidence refers to a measure of confidence that the prefetched data will be subsequently used by the thread, and the prefetcher algorithm typically is configured so that potential prefetches with a prefetch confidence lower than a certain threshold are not permitted to issue as speculative prefetch-type memory requests. Prefetch distance reflects how far ahead in a speculative memory request stream for a thread a prefetcher is permitted to prefetch for, and thus effectively limits, in combination with the prefetch confidence, the rate at which prefetch memory requests are issued on behalf of a thread. Thus, the "aggressiveness" of a prefetcher is reflected by one or both of the prefetch confidence threshold or the prefetch distance employed by the prefetcher. As such, in some embodiments the aggressiveness of a prefetcher is constrained by one or more of: adjusting the prefetcher distance at block 320; adjusting the minimum confidence threshold of the prefetcher (block 322); and either enabling prefetching or disabling prefetching entirely. By modifying the prefetcher aggressiveness in one or more of these ways, the throttle controller 228 effectively modifies the rate at which the prefetcher issues prefetch-type memory requests on behalf of the thread, and thus effectively modifies the memory bandwidth utilization attributable to the thread as a result.

As noted above, in some implementations there are multiple prefetchers operating on behalf of a thread to attempt to prefetch data for the thread, such as the prefetcher 220 of the L1 cache 202 and the prefetcher 222 of the L2 cache 204. However, these prefetchers may have different prefetcher accuracies for the thread for various reasons. Accordingly, in some embodiments, the throttle controller 228 sets a different throttle level for different prefetchers for the same thread based on their respective prefetcher accuracies. In other embodiments, the throttle controller 228 selects a single throttle level based on, for example, the best prefetch accuracy or the worst prefetch accuracy, and applies this same throttle level to each prefetcher for the thread.

The throttle controller 228 may select a throttle level using any of a variety of techniques. In some embodiments, the throttle controller 228 employs a throttle level table 250 that specifies a corresponding throttle level for a corresponding access latency range and prefetch accuracy range pairing. Accordingly, to determine the throttle level to set for a thread, the throttle controller 228 performs a look-up into the throttle level table 250 based on the current access latency metric and current prefetch accuracy metric for that thread to determine the corresponding throttle level to set for that thread. Table 1 below illustrates an example implementation of the throttle level table 250:

TABLE 1

Example Throttle Level Table

| Throttle Level: | Average Read Latency | PF Accuracy Threshold | Max MIBs | Max Prefetch Distance | Disable L1 Prefetcher | Disable L2 Prefetcher |
|---|---|---|---|---|---|---|
| 0 | latency <= 120 ns | N/A | 50 | N/A | No | No |
| 1 | 120 ns < latency <= 150 ns | >=40% | 50 | 30 | No | No |
|   |  | <40% | 50 | 30 | Yes | No |
| 2 | 150 ns < latency <= 180 ns | >=50% | 35 | 24 | No | No |
|   |  | <50% | 35 | 24 | Yes | No |
| 3 | 180 ns < latency <= 210 ns | >=65% | 20 | 15 | No | No |
|   |  | <65% | 20 | N/A | Yes | Yes |
| 4 | latency >210 ns | >=80% | 10 | 6 | Yes | No |
|   |  | <80% | 10 | N/A | Yes | Yes |

Note that throttle level 0 represents no throttling, or the default throttling, for a thread.

In other embodiments, rather than employing a particular throttle level for a given set of metrics, the throttle controller 228 repeatedly increases the severity of throttling for a thread until the metrics for that thread meet specified thresholds. For example, in one embodiment the throttle controller 228 determines an average prefetch accuracy for a prefetcher for all threads being tracked, and in the event that a prefetch accuracy metric for a given thread exceeds this average prefetch accuracy by some amount (e.g., at 150% of the average prefetch accuracy), the throttle controller 228 may iteratively increase the severity of memory request throttling for the thread until the thread's updated prefetch accuracy metric falls below this threshold.

Figure 4:
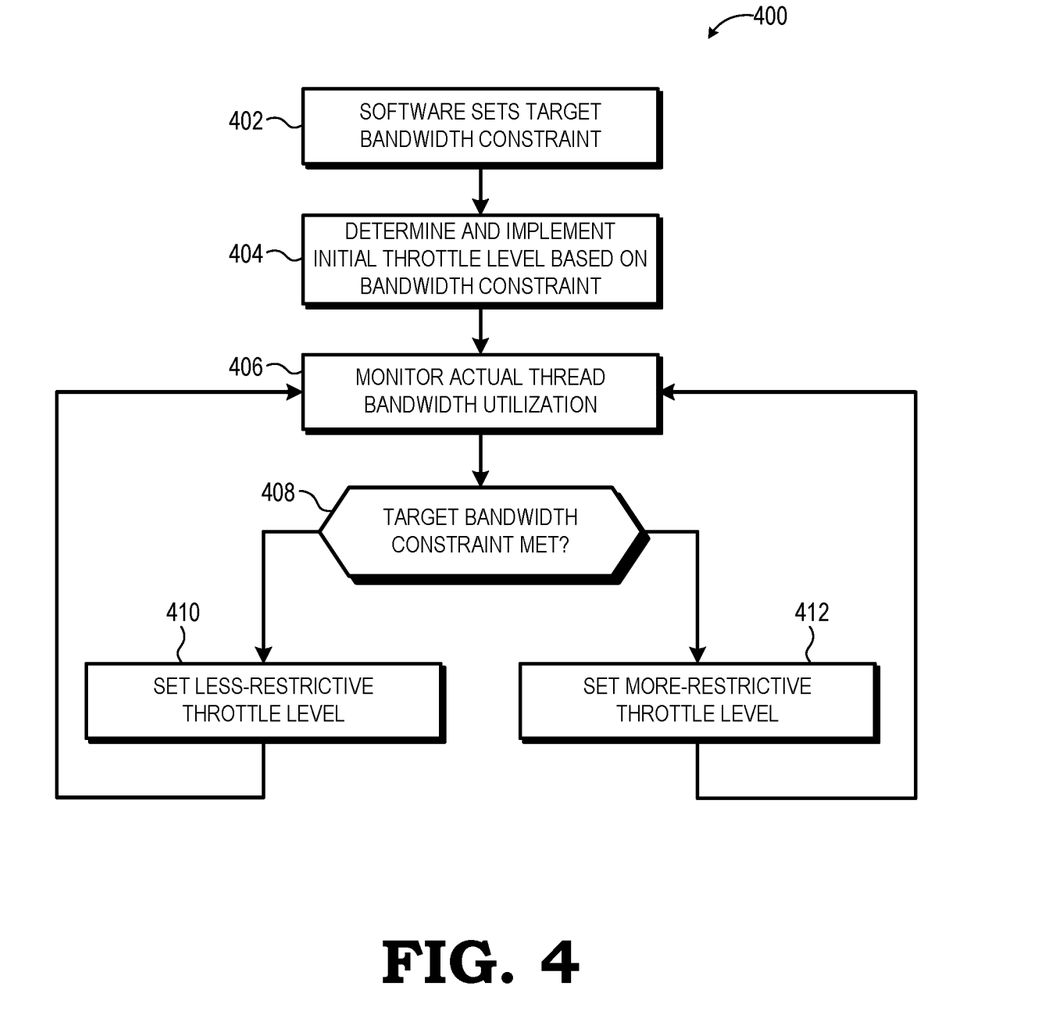
FIG. 4 is a flow diagram illustrating a method for software-configured memory request throttling in accordance with some embodiments.

FIG. 4 illustrates a method 400 for providing a software-defined memory bandwidth constraint on a thread in accordance with some embodiments. As noted above, in some embodiments a software application (e.g., software application 136, FIG. 1) sets a target memory bandwidth utilization constraint on a thread of the software application executed by the processor core 200 of a compute complex. Accordingly, the method 400 initiates at block 402 with the software application setting this target constraint by, for example, executing one or more instructions that cause the processor core 200 to store a value representative of the constraint to the storage element 252 (FIG. 2). In some embodiments, the value represents a particular maximum memory request issuance rate for the thread (e.g., X direct-to-memory memory requests per microsecond). In response, the throttle controller 228 sets and implements an initial throttle level for the thread based on this software-defined target constraint value. In some embodiments, the initial throttle level is set to a default throttle level (e.g., throttle level 0, or no throttling), whereas in other embodiments the throttle controller 228 estimates a corresponding throttle level suitable for the target bandwidth constraint value based on the current access latency metric for the compute complex or the processor core 200.

At block 406, the latency tracker 230 monitors the current actual memory bandwidth utilization by the thread by, for example, tracking the current rate of direct-to-memory memory requests issued on behalf of the thread. At block 408, the throttle controller 228 compares the monitored actual memory bandwidth utilization with the target memory utilization bandwidth constraint set by software. If the software-defined target memory bandwidth utilization constraint is met, then at block 410 the throttle controller 228 adjusts the throttle level for the thread to a less-restrictive throttle level, and returns to monitoring the thread at block 406 under this less-restrictive throttle level. Otherwise, if the software-defined target constraint is not met by the monitored actual memory bandwidth utilization, then at block 412 the throttle controller 228 adjusts the throttle level for the thread to a more-restrictive throttle level and returns to block 406 to monitor the thread under this more-restrictive throttle level. In this manner, the throttle controller 228 dials-in a throttle level that is suitable for the software-defined target constraint. As an example using Table 1 above, assume at block 404 the throttle controller 228 set throttle level 5 as the initial throttle level for a thread at block 404. If throttle level 5 results in the thread issuing direct-to-memory requests at a rate lower than the maximum represented by the software-defined constraint, then the throttle controller 228 may decrement the throttle level to throttle level 4 at block 410. Otherwise, if the rate of memory request issuance exceeds the maximum, the throttle controller 228 may increment the throttle level to throttle level 5 at block 412, and thereby further constrain the rate of memory request issuance in an attempt to meet the software-defined constraint.

In some embodiments, the memory bandwidth constraint subsystem 134 may implement both the dynamic hardware-controlled memory request throttling represented by the method 300 and the software-defined memory request throttling represented by the method 400. In such instances, the software-defined target memory bandwidth utilization constraint controls the least-restrictive memory throttling level that may be employed by the throttle controller 228 in accordance with method 400, and the throttle controller 228 this is permitted to implement a more-restrictive throttle level in accordance with the dynamic throttle level setting method 300.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for memory request throttling in a processing system, the method comprising:
   determining, at a latency tracker of a cache of the processing system, an access latency metric representing an average access latency for memory requests for a processor core of the processing system;

determining, at a prefetch accuracy tracker of the cache, a prefetch accuracy metric representing an accuracy of a prefetcher of the cache; and setting, at a throttle controller of the cache, a throttle level for a thread executing at the processor core by modifying a maximum prefetch distance of the prefetcher based on at least one of the access latency metric and the prefetch accuracy metric, wherein the throttle level sets a maximum number of pending memory request entries of a buffer that are available to the processor core, wherein the buffer is a miss information buffer (MIB) associated with the cache and is configured as a buffer for read misses at the cache.

2. The method of claim 1, wherein setting the throttle level for the thread executing at the processor core further comprises: modifying an aggressiveness of the prefetcher based on at least one of the access latency metric and the prefetch accuracy metric.

3. The method of claim 2, wherein the maximum number of pending memory requests is a maximum number of missed information buffer (MIB) entries available for use by the processor core.

4. The method of claim 2, wherein modifying the aggressiveness of the prefetcher further comprises modifying a minimum prefetch confidence of the prefetcher.

5. The method of claim 2, wherein modifying the aggressiveness of the prefetcher further comprises:
selectively disabling the prefetcher.

6. The method of claim 1, wherein setting the throttle level for the thread executing at the processor core constrains use of bandwidth between a compute complex of the processing system and a local memory based on a maximum bandwidth utilization metric.

7. The method of claim 1, wherein:
determining the prefetch accuracy metric comprises determining the prefetch accuracy metric for a specified thread executing at the processor core; and
setting the throttle level for the thread executing at the processor core comprises throttling a rate of memory access requests issuable by the processor core for the specified thread.

8. The method of claim 1, wherein determining the access latency metric comprises:
sampling a plurality of memory requests issued to a local memory associated with the processor core to generate a sample set of memory requests;
measuring, for each memory request of the sample set, a corresponding access latency for fulfilling the memory request; and
determining the access latency metric based on an averaging of the access latencies measured for the sample set of memory requests.

9. The method of claim 1, wherein setting the throttle level for the thread executing at the processor core comprises:
accessing a data structure representing a plurality of throttle levels, each throttle level representing a corresponding modification to at least one of: a maximum number of pending memory transactions available and a level of prefetcher aggressiveness, and each throttle level is associated with at least one of a corresponding latency threshold and a corresponding prefetch accuracy threshold; and
selecting a throttle level to implement for the processor core based on comparison of at least one of: the access latency metric to the respective latency thresholds of the plurality of throttle levels; and the prefetch accuracy metric to respective prefetch accuracy thresholds of the plurality of throttle levels.

10. The method of claim 1, wherein the throttle level modifies the maximum number of pending memory request entries of a buffer that are available to the processor core.

11. A processing system, comprising:
an interconnect fabric coupleable to a local memory; and
at least one compute cluster coupled to the interconnect fabric, the compute cluster comprising:
a processor core; and
a cache hierarchy comprising:
a plurality of caches;
a throttle controller configured to set a throttle level for a thread executing at the processor core based on at least one of an access latency metric and a prefetch accuracy metric, wherein the throttle level sets a maximum number of pending memory request entries of a buffer that is available to the processor core, and wherein the buffer is a miss information buffer (MIB) associated with the cache and is configured as a buffer for read misses at the cache;
wherein the access latency metric represents an average access latency for memory requests for the processor core; and
wherein the prefetch accuracy metric represents an accuracy of a prefetcher of a cache of the cache hierarchy.

12. The processing system of claim 11, wherein the throttle controller is further configured to set the throttle level for the thread executing at the processor core by:
modifying an aggressiveness of the prefetcher based on at least one of the access latency metric and the prefetch accuracy metric.

13. The processing system of claim 12, wherein the maximum number of pending memory requests is a maximum number of missed information buffer (MIB) entries available for use by the processor core.

14. The processing system of claim 12, wherein the throttle controller is configured to modify the aggressiveness of the prefetcher by at least one of:
modifying a maximum prefetch distance of the prefetcher;
modifying a minimum prefetch confidence of the prefetcher; and
selectively disabling the prefetcher.

15. The processing system of claim 12, wherein the throttle controller is further configured to modify the aggressiveness of the prefetcher by:
modifying a minimum prefetch confidence of the prefetcher.

16. The processing system of claim 11, wherein the throttle controller is further configured to set the throttle level for the thread executing at the processor core by:
constraining use of bandwidth between the compute cluster and a local memory associated with the processing system based on a maximum bandwidth utilization metric.

17. The processing system of claim 11, wherein the cache hierarchy further comprises:
a prefetch accuracy tracker configured to determine the prefetch accuracy metric for a specified thread executing at the processor core; and
wherein the throttle controller is configured to t set the throttle level for the specified thread.

18. The processing system of claim 1, wherein the cache hierarchy further comprises:

a latency tracker to determine the access latency metric by:
    sampling a plurality of memory requests issued to a local memory associated with the processor core to generate a sample set of memory requests;
    measuring, for each memory request of the sample set, a corresponding access latency for fulfilling the memory request; and
    determining the access latency metric based on an averaging of the access latencies measured for the sample set of memory requests.

19. The processing system of claim 11, wherein the throttle level modifies the maximum number of pending memory requests available for the processor core.

20. A method for throttling memory bandwidth utilization in a processing system, the method comprising:
    executing a software application at a processor core of a compute cluster of the processing system, the software application including at least one instruction to configure the processor core to set a target memory utilization bandwidth constraint for a thread of the software application;
    monitoring an actual memory utilization bandwidth of the thread at the compute cluster;
    incrementally modifying a throttling level set for the thread until the monitored actual memory utilization bandwidth meets the target memory utilization bandwidth, wherein the throttle level sets a maximum number of pending memory request entries of a buffer that is available to the thread, and wherein the buffer is a miss information buffer (MIB) associated with a cache that is associated with the thread and the MIB is configured as a buffer for read misses at the cache; and
    wherein the throttling level configures at least one of:
        an aggressiveness of a prefetcher of the cache associated with the thread; and
        a maximum number of pending transactions available for the thread.

21. The method of claim 20, wherein the throttling level configures the aggressiveness of the prefetcher by at least one of:
    modifying a prefetch distance of the prefetcher; and
    modifying a minimum prefetch confidence of the prefetcher.

22. The method of claim 20, wherein the throttling level configures the aggressiveness of the prefetcher by:
    selectively disabling the prefetcher.

* * * * *

UNITED STATES PATENT AND TRADEMARK OFFICE
CERTIFICATE OF CORRECTION

| | |
|---|---|
| PATENT NO. | : 11,294,810 B2 |
| APPLICATION NO. | : 15/838809 |
| DATED | : April 5, 2022 |
| INVENTOR(S) | : William L. Walker and William E. Jones |

It is certified that error appears in the above-identified patent and that said Letters Patent is hereby corrected as shown below:

In the Claims

At Column 14 Line 66, please replace "1" with "10" after "claim" and before "wherein"

Signed and Sealed this
Ninth Day of January, 2024

*Katherine Kelly Vidal*

Katherine Kelly Vidal
*Director of the United States Patent and Trademark Office*